(12) United States Patent
Kang et al.

(10) Patent No.: US 8,325,275 B2
(45) Date of Patent: Dec. 4, 2012

(54) INFORMATION STORAGE MEDIUM CONTAINING SUBTITLES AND PROCESSING APPARATUS THEREFOR

(75) Inventors: Man-seok Kang, Suwon-si (KR); Seong-jin Moon, Suwon-si (KR); Hyun-kwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 12/046,546

(22) Filed: Mar. 12, 2008

(65) Prior Publication Data

US 2008/0152306 A1  Jun. 26, 2008

Related U.S. Application Data

(63) Continuation of application No. 10/984,776, filed on Nov. 10, 2004.

(30) Foreign Application Priority Data

Nov. 10, 2003  (KR) ................................ 2003-79181
Oct. 19, 2004  (KR) ................................ 2004-83517

(51) Int. Cl.
*H04N 7/00* (2006.01)
*H04N 11/00* (2006.01)
(52) U.S. Cl. .................... 348/468; 386/244; 386/245
(58) Field of Classification Search .................. 348/468, 348/460–462, 552, 589, 596, 477, 478; 386/244, 386/245
See application file for complete search history.

(56) References Cited

U.S. PATENT DOCUMENTS

| 5,541,662 | A  | 7/1996  | Adams et al.     |
| 5,689,799 | A  | 11/1997 | Dougherty et al. |
| 5,745,454 | A  | 4/1998  | Yokota           |
| 5,847,770 | A  | 12/1998 | Yagasaki         |
| 5,848,352 | A  | 12/1998 | Dougherty et al. |
| 5,987,214 | A  | 11/1999 | Iwamura          |
| 6,288,990 | B1 | 9/2001  | Fujiie et al.    |
| 6,480,238 | B1 | 11/2002 | Knox et al.      |
| 6,480,669 | B1 | 11/2002 | Tsumagari et al. |
| 6,775,467 | B1 | 8/2004  | Su               |
| 7,050,109 | B2 | 5/2006  | Safadi et al.    |
| 7,212,679 | B2 | 5/2007  | Smeets et al.    |

(Continued)

FOREIGN PATENT DOCUMENTS

CN  1781149  5/2006

(Continued)

OTHER PUBLICATIONS

U.S. Publication 2004/202454 dated Oct. 14, 2004 (English Abstract).

(Continued)

*Primary Examiner* — Michael Lee
(74) *Attorney, Agent, or Firm* — NSIP Law

(57) ABSTRACT

An information storage medium containing subtitles and a subtitle processing apparatus, where the information storage medium includes: audio-visual (AV) data; and subtitle data in which at least one subtitle text data and output style information designating an output form of the subtitle texts are stored with a text format. With this, output times of subtitle texts included in the text subtitle data can be overlapped, a subtitle file can be easily produced, and subtitles for an AV stream can be output with various forms.

2 Claims, 11 Drawing Sheets

U.S. PATENT DOCUMENTS

| | | | |
|---|---|---|---|
| 7,356,248 | B2 | 4/2008 | Bae et al. |
| 2001/0030710 | A1 | 10/2001 | Werner |
| 2002/0194618 | A1 | 12/2002 | Okada et al. |
| 2003/0020834 | A1 | 1/2003 | Gomikawa |
| 2004/0081434 | A1 | 4/2004 | Jung et al. |
| 2004/0202454 | A1 | 10/2004 | Kim et al. |
| 2005/0019014 | A1* | 1/2005 | Yoo et al. .................. 386/95 |
| 2006/0222333 | A1* | 10/2006 | McCrossan et al. ............ 386/95 |

FOREIGN PATENT DOCUMENTS

| | | |
|---|---|---|
| EP | 0 791 925 A2 | 8/1997 |
| EP | 1 267 273 A2 | 12/2002 |
| EP | 1 306 848 A1 | 5/2003 |
| EP | 1 381 232 A1 | 1/2004 |
| JP | 9-91880 | 4/1997 |
| JP | 11-232849 A | 8/1999 |
| JP | 2000-39892 | 2/2000 |
| JP | 2000-322875 | 11/2000 |
| JP | 2001-036865 | 2/2001 |
| JP | 2001-135066 | 5/2001 |
| JP | 2002-27386 | 1/2002 |
| JP | 2002-118821 | 4/2002 |
| JP | 2002-199354 | 7/2002 |
| JP | 2002-369154 | 12/2002 |
| JP | 2003-37792 A | 2/2003 |
| JP | 2004-194131 | 7/2004 |
| KR | 2002-64463 | 8/2002 |
| KR | 2004-51446 | 6/2004 |
| RU | 2181929 C2 | 4/2002 |
| TW | 358204 | 5/1999 |
| TW | 525137 | 3/2003 |
| WO | WO 92/00647 A1 | 1/1992 |
| WO | WO 03/036460 | 5/2003 |
| WO | WO 2004/036574 A1 | 4/2004 |
| WO | WO 2004/090885 A1 | 10/2004 |
| WO | WO 2005/010881 A1 | 2/2005 |
| WO | WO 2005/031740 A1 | 4/2005 |
| WO | WO 2005/034122 | 4/2005 |

OTHER PUBLICATIONS

U.S. Appl. No. 10/984,776, filed Nov. 10, 2004, Kang et al., Samsung Electronics Co., Ltd.
U.S. Appl. No. 12/046,552, filed Mar. 12, 2008, Kang et al., Samsung Electronics Co., Ltd.
U.S. Appl. No. 12/046,556, filed Mar. 12, 2008, Kang et al., Samsung Electronics Co., Ltd.
ETSI EN 300 743, *Digital Video Broadcasting System (DVB); Subtitling systems*, Final Draft, V1.2.1, Jun. 2002, European Telecommunications Standards Institute, Sophia Antipolis, France (48 pages).
Korean Office Action issued on Mar. 28, 2006, in counterpart Korean Application No. 2004-83517 (4 pages, in Korean, including complete English translation).
Russian Office Action issued on Jul. 10, 2007, in counterpart Russian Application No. 2006120480 (8 pages, in Russian, including complete English translation).
Extended European Search Report issued on Jan. 29. 2009, in counterpart European Application No. 08154560.0 (9 pages).
Mexican Office Action issued on May 21, 2009, in counterpart Mexican Application No. PA/a/2006/005152 (6 pages, in Spanish, including partial English translation).
Japanese Office Action issued on Dec. 1, 2009, in counterpart Japanese Application No. 2006-539384 (4 pages, in Japanese, including complete English translation).
Microsoft Corp., "Accessibility Technical Articles: Understanding SAMI 1.0—Paper No. XP007902747", Feb. 2003, http://msdn2.microsoft.com/en-us/library/ms971327(d=printer).aspx.
Supplementary European Search Report issued on Aug. 20, 2007, in counterpart European Application No. 04818269.5 (5 pages, in English).
Office Action dated Jul. 28, 2009 issued in related Japanese Patent Application No. 2006-539384.
Office Action issued in Taiwanese Patent Application No. 093134224 on Nov. 20, 2008.
Office Action issued in Chinese Patent Application No. 200480032931.4 on Nov. 7, 2008.
Japanese Office Action issued on Aug. 2, 2011, in counterpart Japanese Application No. 2009-248052 (2 pages, in Japanese, no English translation).
Office Action issued on Feb. 17, 2012, in Russia Patent Application No. 2008110465 and English translation thereof.
Office Action issued on Feb. 17, 2012, in Russia Patent Application No. 2008110464 and English translation thereof.
Office Action issued on Feb. 17, 2012, in Russia Patent Application No. 2008110463 and English translation thereof.
U.S. Appl No. 60/486,844 filed on Jul. 11, 2003, available to the public on Jan. 20, 2005, in file of International Application No. PCT/JP04/10155 filed on Jul. 9, 2004, and published on Jan. 20, 2005, as WO 2005/006747.
International Search Report and Written Opinion of the International Search Authority issued on Feb. 23, 2005, in counterpart International Application No. PCT/KR2004/002904 (6 pages).
U.S. Appl. No. 60/464,866 (4 pages).
Office Action issued on Jul. 3, 2012, in counterpart Russian Patent Application No. 2008110465 and English translation thereof.
Office Action issued on Jul. 3, 2012, in counterpart Russian Patent Application No. 2008110464 and English translation thereof.
Office Action issued on Jul. 3, 2012, in counterpart Russian Patent Application No. 2008110463 and English translation thereof.

\* cited by examiner

FIG. 6A

```
<style name="Script" font="Arial.ttf" color="black"
background="white" size="16pt" position="x, y" align="center"
direction="left-to-right-top-to-bottom" region="left, top, width,
height" line-height="40px" />
```

FIG. 6B

```
<text start="00:10:00" end="00:15:00" style="Script">
        Hello                                              } 610
</text>
<text start="00:12:00" end="00:17:00" style="Script">
        <br/>Subtitle                                      } 620
</text>
<text start="00:14:00" end="00:19:00" style="Script">
        <br/><br/>World                                    } 630
</text>
```

FIG. 7A

```
<style name="Script1" font="Arial.ttf" color="black"
background="white" size="16pt" position="x1, y1" align="center"
direction="left-to-right-top-to-bottom" region="left1, top1, width1,
height1" line-height="40px" />
```

```
<style name="Script2" font="Arial.ttf" color="black"
background="white" size="16pt" position="x2, y2" align="center"
direction="left-to-right-top-to-bottom" region="left2, top2, width2,
height2" line-height="40px" />
```

```
<style name="Script3" font="Arial.ttf" color="black"
background="white" size="16pt" position="x3, y3" align="center"
direction="left-to-right-top-to-bottom" region="left3, top3, width3,
height3" line-height="40px" />
```

FIG. 7B

```
<text start="00:10:00" end="00:15:00" style="Script1">     ⎫
        Hello                                              ⎬ 710
</text>                                                    ⎭
<text start="00:12:00" end="00:17:00" style="Script2">     ⎫
        Subtitle                                           ⎬ 720
</text>                                                    ⎭
<text start="00:14:00" end="00:19:00" style="Script3">     ⎫
        World                                              ⎬ 730
</text>                                                    ⎭
```

FIG. 8A

```
<style name="Script1" font="Arial.ttf" color="black"
background="white" size="16pt" position="x1, y1" align="center"
direction="left-to-right-top-to-bottom" region="left1, top1, width1,
height1" line-height="40px" />
```

```
<style name="Script2" font="Arial.ttf" color="black"
background="white" size="16pt" position="x2, y2" align="center"
direction="left-to-right-top-to-bottom" region="left2, top2, width2,
height2" line-height="40px" />
```

```
<style name="Script3" font="Arial.ttf" color="black"
background="white" size="16pt" position="x3, y3" align="center"
direction="left-to-right-top-to-bottom" region="left3, top3, width3,
height3" line-height="40px" />
```

FIG. 8B

```
<text start="00:10:00" end="00:15:00" style="Script1">
        Hello                                              } 810
</text>
<text start="00:12:00" end="00:17:00" style="Script2">
        Subtitle                                           } 820
</text>
<text start="00:14:00" end="00:19:00" style="Script3">
        World                                              } 830
</text>
```

INFORMATION STORAGE MEDIUM CONTAINING SUBTITLES AND PROCESSING APPARATUS THEREFOR

CROSS-REFERENCE TO RELATED APPLICATIONS

This application is a continuation of application Ser. No. 10/984,776 filed on Nov. 10, 2004, currently pending, which claims the benefit of Korean Patent Application No. 2003-79181 filed on Nov. 10, 2003, in the Korean Intellectual Property Office and Korean Patent Application No. 2004-83517 filed on Oct. 19, 2004, in the Korean Intellectual Property Office. The disclosures of application Ser. No. 10/984,776 and Korean Patent Application Nos. 2003-79181 and 2004-83517 are incorporated herein by reference in their entirety.

BACKGROUND OF THE INVENTION

1. Field of the Invention

The present invention relates to an information storage medium, and more particularly, to an information storage medium containing a plurality of subtitles that can be separately displayed and a processing apparatus therefor.

2. Description of the Related Art

A conventional subtitle is a bitmap image that is included in an audio-visual (AV) stream. Therefore, it is inconvenient to produce such a subtitle, and there is no choice but to merely read the subtitle in its present form without modification since a user cannot select various attributes of the subtitle defined by a subtitle producer. That is, since the attributes, such as font, character size, and character color, are predetermined and included in the AV stream as a bitmap image, the user cannot change the attributes at will.

Also, since the subtitle is compressed and encoded in the AV stream, an output start time and an output end time of the subtitle are clearly designated to correspond to the AV stream, and reproduction times when subtitles are output should not overlap. That is, only one subtitle should be output at a certain time.

However, since an output start time and an output end time of a subtitle are designated by a subtitle producer and recorded on an information storage medium separately from the AV stream, the output start times and output end times of a plurality of subtitles may overlap one another. In other words, since more than two subtitles may be output in a certain time period, a method of solving this problem is necessary.

SUMMARY OF THE INVENTION

In an aspect of the present invention, the present invention provides an information storage medium having recorded thereon a plurality of text subtitles that are separately displayed although overlapping one another and an apparatus for reproducing the information storage medium.

According to an aspect of the present invention, there is provided an information storage medium including: AV data; and subtitle data in which at least one subtitle text data or output style information designating an output form of the subtitle texts are stored in a text format.

In an aspect of the present invention, the output style information contains pieces of information so that the output style information is differently applied to the subtitle texts.

In an aspect of the present invention, when a plurality of subtitle data exists, the plurality of subtitle data is separately rendered, and rendered images compose a plurality of pages, respectively.

According to another aspect of the present invention, there is provided a text subtitle processing apparatus including: a text subtitle parser separately extracting rendering information used to render a text from text subtitle data and control information used to present the rendered text; and a text layout/font renderer generating a bitmap image of a subtitle text by rendering the subtitle text according to the extracted rendering information.

In an aspect of the present invention, the text layout/font renderer renders at least one subtitle text data by applying different styles to the subtitle text data and composes a plurality of pages with a plurality of rendered images.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A through 6C are diagrams illustrating a process of generating an image for a plurality of subtitles using one composition information data and one position information data;

FIGS. 7A through 7C are diagrams illustrating a process of generating an image for a plurality of subtitles using one composition information data and a plurality of position information data; and FIGS. 8A through 8C are diagrams illustrating a process of generating an image so that one image object is included in one composition information data by allocating a plurality of composition information data for a plurality of subtitles.

DETAILED DESCRIPTION OF THE EMBODIMENTS

Figure 1:
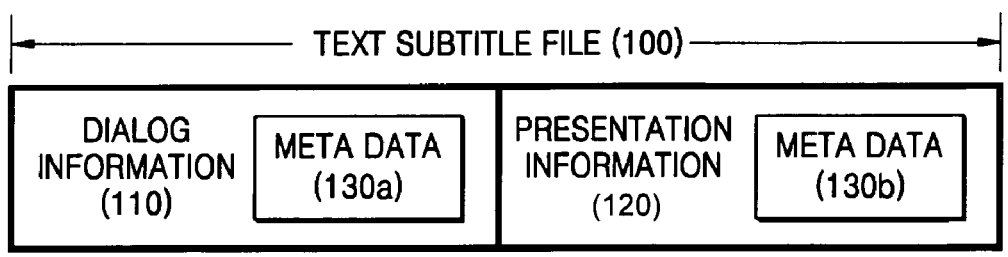
FIG. 1 illustrates a structure of a text subtitle file.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a structure of a text subtitle file 100. Referring to FIG. 1, the text subtitle file 100 includes dialog information 110, presentation information 120, and meta data 130a and 130b.

The dialog information 110 includes subtitle texts, output start times of the subtitle texts, output end times of the subtitle texts, style groups or style information used to render the subtitle texts, text change effect information such as fade-in and fade-out, and a formatting code of the subtitle texts. The formatting code includes one or more of a code displaying a text with bold characters, a code for displaying the text in italics, a code indicating underlining, or a code indicating a line change.

The presentation information 120 includes style information used to render the subtitle texts and comprises a plurality of style groups. A style group is a bundle of styles in which the style information is recorded. A style includes information used to render and display a subtitle text. This information includes, for example, one or more of a style name, a font, a text color, a background color, a text size, a line-height, a text output region, a text output start position, an output direction, or an alignment method.

The meta data 130*a* and 130*b*, which are additional information of a moving picture, include information required to perform additional functions except a subtitle output function. For example, an additional function may be displaying a TV Parental Guideline such as "TV-MA" on a screen for a program intended for mature audiences.

Figure 2:
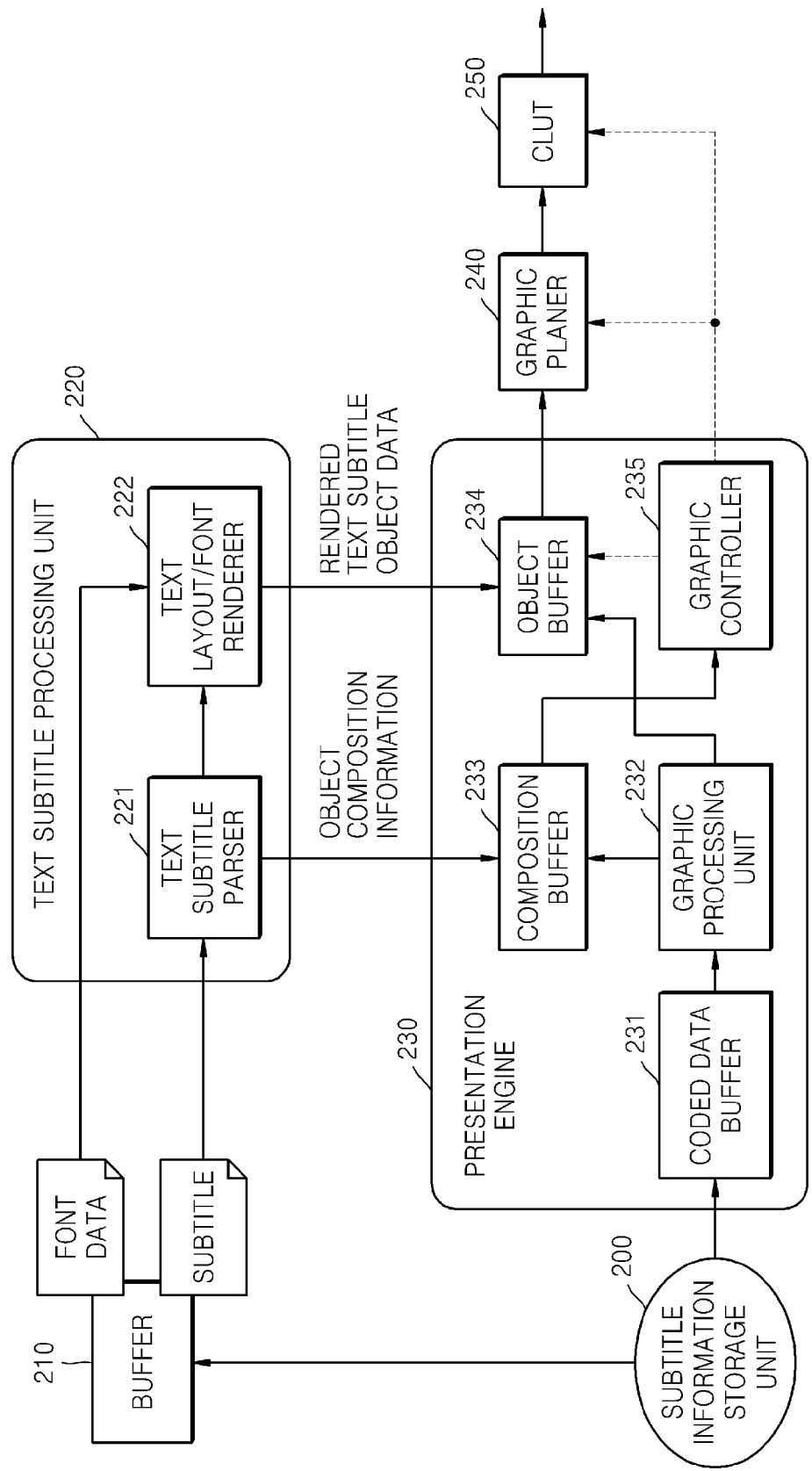
FIG. 2 is a block diagram of an apparatus reproducing an information storage medium on which a text subtitle is recorded.

FIG. 2 is a block diagram of an apparatus reproducing an information storage medium on which a text subtitle file is recorded. It is understood that the apparatus may also record the text subtitle file to the information storage medium.

Referring to FIG. 2, a text subtitle processing unit 220 renders a subtitle text in order to process a text subtitle file. The text subtitle processing unit 220 includes a text subtitle parser 221, which extracts presentation information and dialog information from the text subtitle file, and a text layout/font renderer 222, which generates an output image by rendering the subtitle text according to the extracted presentation information.

The text subtitle file 100 illustrated in FIG. 1 may be recorded on an information storage medium or in a memory included in a reproducing apparatus. In FIG. 2, the information storage medium on which or the memory in which the text subtitle file is recorded is called a subtitle information storage unit 200.

A text subtitle file corresponding to a moving picture being reproduced and font data to be used to render the subtitle are read from the subtitle information storage unit 200 and stored in a buffer 210. The text subtitle file stored in the buffer 210 is transmitted to a text subtitle parser 221, which parses the text subtitle file to obtain information required to render the subtitle. A subtitle text, font data, and rendering style information are transmitted to the text layout/font renderer 222, and control information of the subtitle text is transmitted to a composition buffer 233 of a presentation engine 230. The control information (i.e., information for displaying a screen with the subtitle text) is object composition information that includes an output region and an output start position.

The text layout/font renderer 222 generates a bitmap image by rendering the subtitle text using the rendering style information transmitted from the text subtitle parser 221 and the font data transmitted from the buffer 210, composes one subtitle page by designating an output start time and an output end time of each subtitle text, and transmits the bitmap image and the subtitle page to an object buffer 234 of the presentation engine 230 as rendered text subtitle object data.

The subtitle of the bitmap image form read from the subtitle information storage unit 200 is input to a coded data buffer 231 and processed by a graphic processing unit 232 in the presentation engine 230. Accordingly, the graphic processing unit 232 generates a bitmap image. The generated bitmap image is transmitted to the object buffer 234, and control information of the bitmap image is transmitted to the composition buffer 233. The control information is used to designate a time and a position at which the bitmap image stored in the object buffer 234 is to be output to a graphic planer 240, and designate a color lookup table (CLUT) 250 in which color information to be applied to the bitmap image output to the graphic planer 240 is recorded. The composition buffer 233 receives the object composition information transmitted from the text subtitle parser 221 and the control information of the bitmap image transmitted from by the graphic processing unit 232, and transmits control information for outputting the subtitle onto a screen to a graphic controller 235. The graphic controller 235 controls the object buffer 234 to combine the bitmap image received from the graphic processing unit 232 and the rendered text subtitle object data received from the text layout/font renderer 222, and controls the graphic planer 240 to generate a graphic plane from the combined data, and output the graphic plane to a display unit (not shown) with reference to the CLUT 250.

Figure 3:
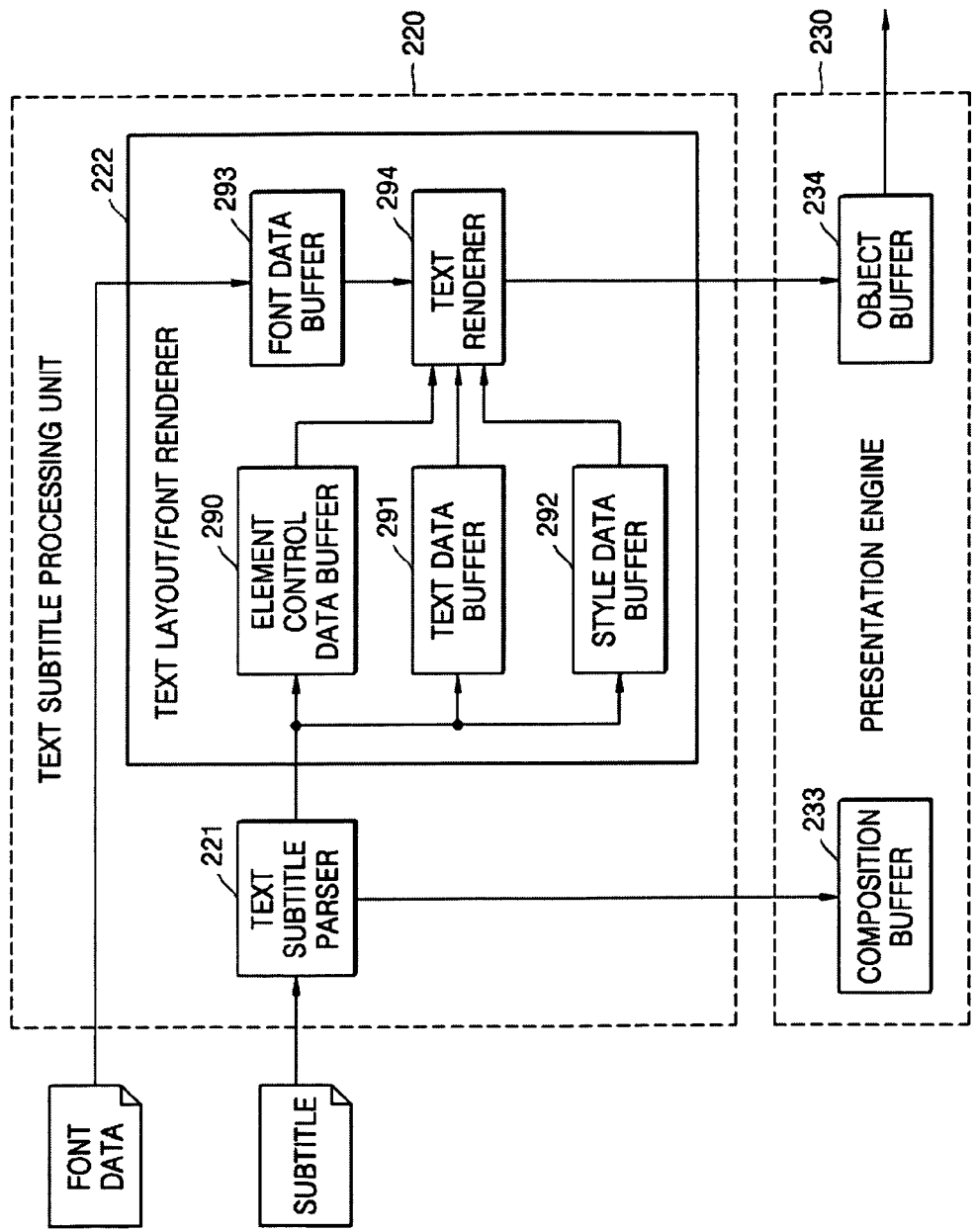
FIG. 3 is a detailed block diagram of the text subtitle processing unit of FIG. 2.

FIG. 3 is a detailed block diagram of the text subtitle processing unit 220 of FIG. 2. Referring to FIG. 3, a subtitle, which is text subtitle file information, is input to the text subtitle parser 221. The text subtitle parser 221 transmits subtitle control information parsed from the subtitle to the presentation engine 230 and text rendering information parsed from the subtitle to the text layout/font renderer 222. The text layout/font renderer 222 receives the text rendering information from the text subtitle parser 221 and stores control information of a subtitle text in an element control data buffer 290, subtitle text data in a text data buffer 291, and style information used to render the subtitle text data in a style data buffer 292. Also, the text layout/font renderer 222 stores font data used for text rendering in a font data buffer 293.

The control information stored in the element control data buffer 290 may be a formatting code. The formatting code includes one or more of a code displaying a text with bold characters, a code displaying the text in italics, a code indicating underlining, or a code indicating a line change. The subtitle text data stored in the text data buffer 291 is text data to be output as a subtitle. The style information stored in the style data buffer 292 may be one or more of data such as a font, a text color, a background color, a text size, a line-height, a text output region, a text output start position, an output direction, or an alignment method. A text renderer 294 generates a subtitle image with reference to the information recorded in each buffer and transmits the subtitle image to the presentation engine 230.

Figure 4:
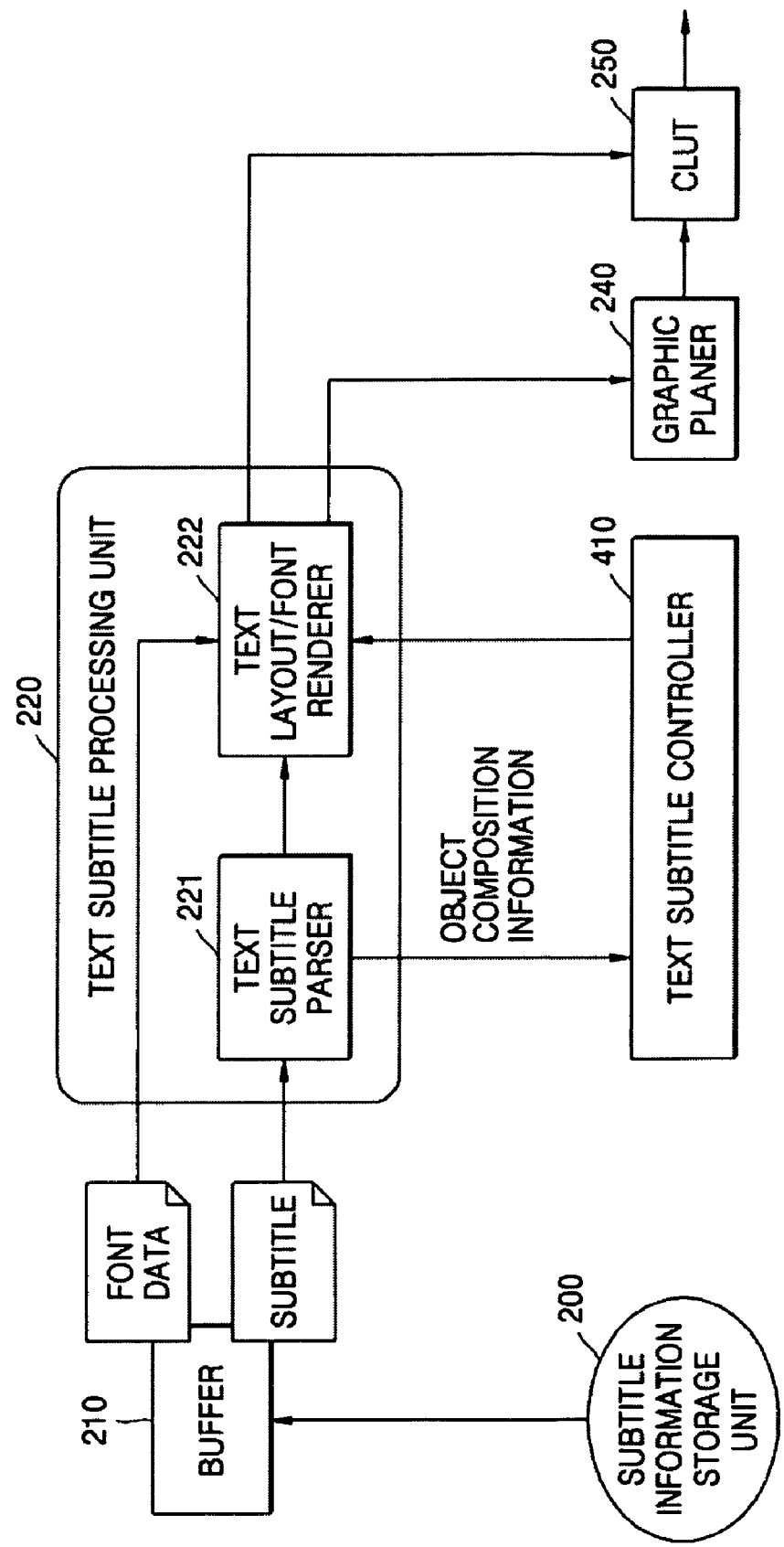
FIG. 4 is a reference block diagram illustrating generation of a bitmap image without a presentation engine.

FIG. 4 is a reference block diagram illustrating generation of a bitmap image without the presentation engine 230.

That is, FIG. 4 illustrates another embodiment of an operation of the text subtitle processing unit 220 which includes a text subtitle controller 410 instead of the presentation engine 230.

Referring to FIG. 4, the text layout/font renderer 222 generates composition information, position information, object information, and color information and generates a bitmap image on the basis of the composition information, the position information, the object information, and the color information. The text subtitle controller 410 receives object composition information from the text subtitle parser 221 and controls the text layout/font renderer 222 to directly output the bitmap image generated by the text layout/font renderer 222 to the graphic planer 240 and the CLUT 250.

Figure 5:
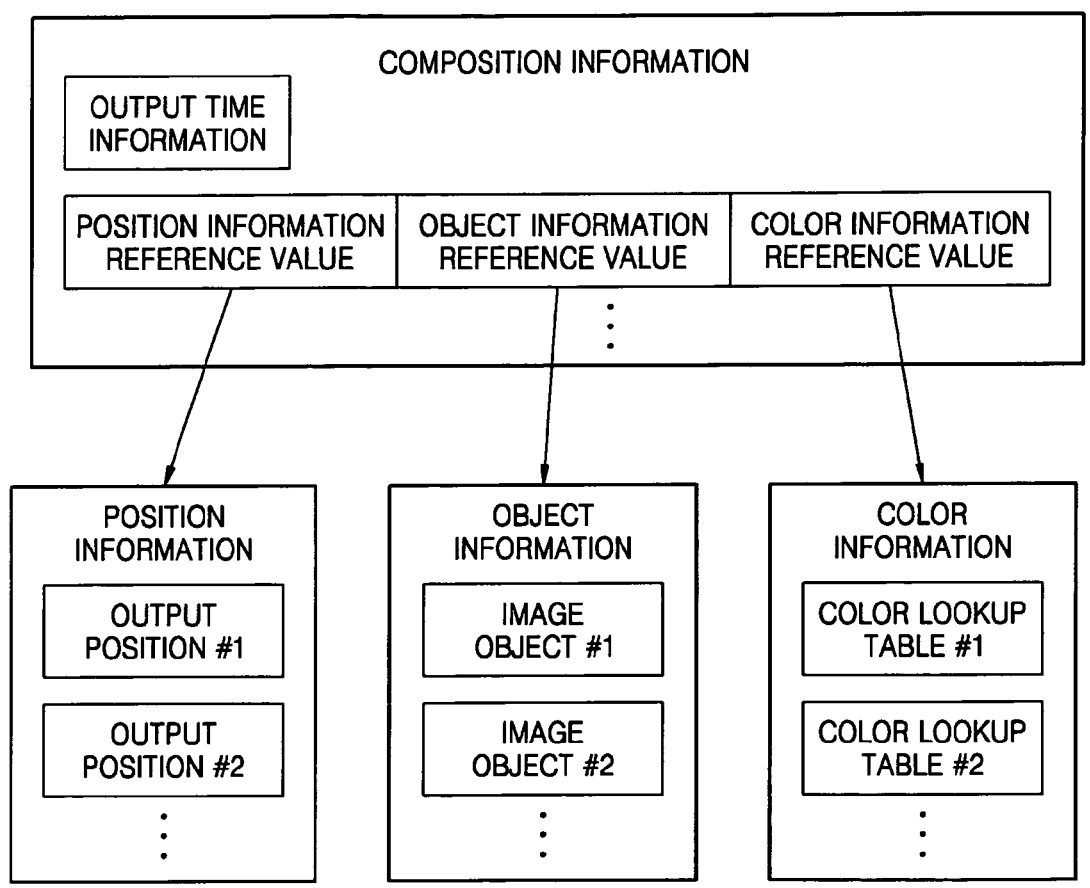
FIG. 5 is an example diagram illustrating correlations between structures in which composition information, position information, object information, and color information are recorded.

FIG. 5 is an example diagram illustrating correlations between structures in which composition information, position information, object information, and color information are recorded.

A subtitle that is output onto a screen is composed of page units. Each page can also include data used for other purposes besides the subtitle. The composition information refers to information containing information used to compose one page. The composition information includes output time information indicating a page output time, an object information reference value indicating an output image object, a position information reference value indicating an object output position, and a color information reference value indicating object color information.

The correlations between the information structures shown in FIG. 5 are a part of the composition information, and it is also possible to compose the correlations between position information, object information, and color information in a different form from FIG. 5.

Referring to FIG. 5, one page can include at least one region for outputting an image onto a screen. The at least one region is classified by the position information reference value. Position information refers to a recorded structure of information required to compose the at least one region to output the image. The position information includes information of horizontal and vertical coordinates of each region, a width of the region, and a height of the region. The object information includes object data to be displayed on the screen. Also, the object information includes object data type information corresponding to the object data.

An operation of the text subtitle processing unit 220 will be described as an example. The text subtitle processing unit 220 generates the composition information, the position information, the object information, and the color information of each rendered subtitle image to be output onto the screen in order to provide a subtitle text. The generated composition information, position information, object information, and color information are transmitted to the presentation engine 230.

As described above, when an information storage medium containing subtitles generated in a text form is reproduced, various exemplary methods of outputting more than one subtitle at the same time exist.

In a first method, the text subtitle processing unit 220 generates a new image for a plurality of subtitles, text output times of which are overlapped, and transmits a subtitle composed of objects generated to be output to one position information in one composition information to the presentation engine 230.

There is a second method of composing the subtitles so that the subtitles, text output times of which are overlapped, have different position information. That is, the text subtitle processing unit 220 generates an image of the plurality of subtitles, text output times of which are overlapped, using different position information data in one composition information and transmits the generated image to the presentation engine 230.

There is a third method of generating subtitles, text output times of which are overlapped, using different composition information. That is, the text subtitle processing unit 220 generates different composition information data for a plurality of subtitles, text output times of which are overlapped, so that only one object is included in one composition information data.

The three methods will be described in detail with reference to FIGS. 6 through 8.

Figure 6C:
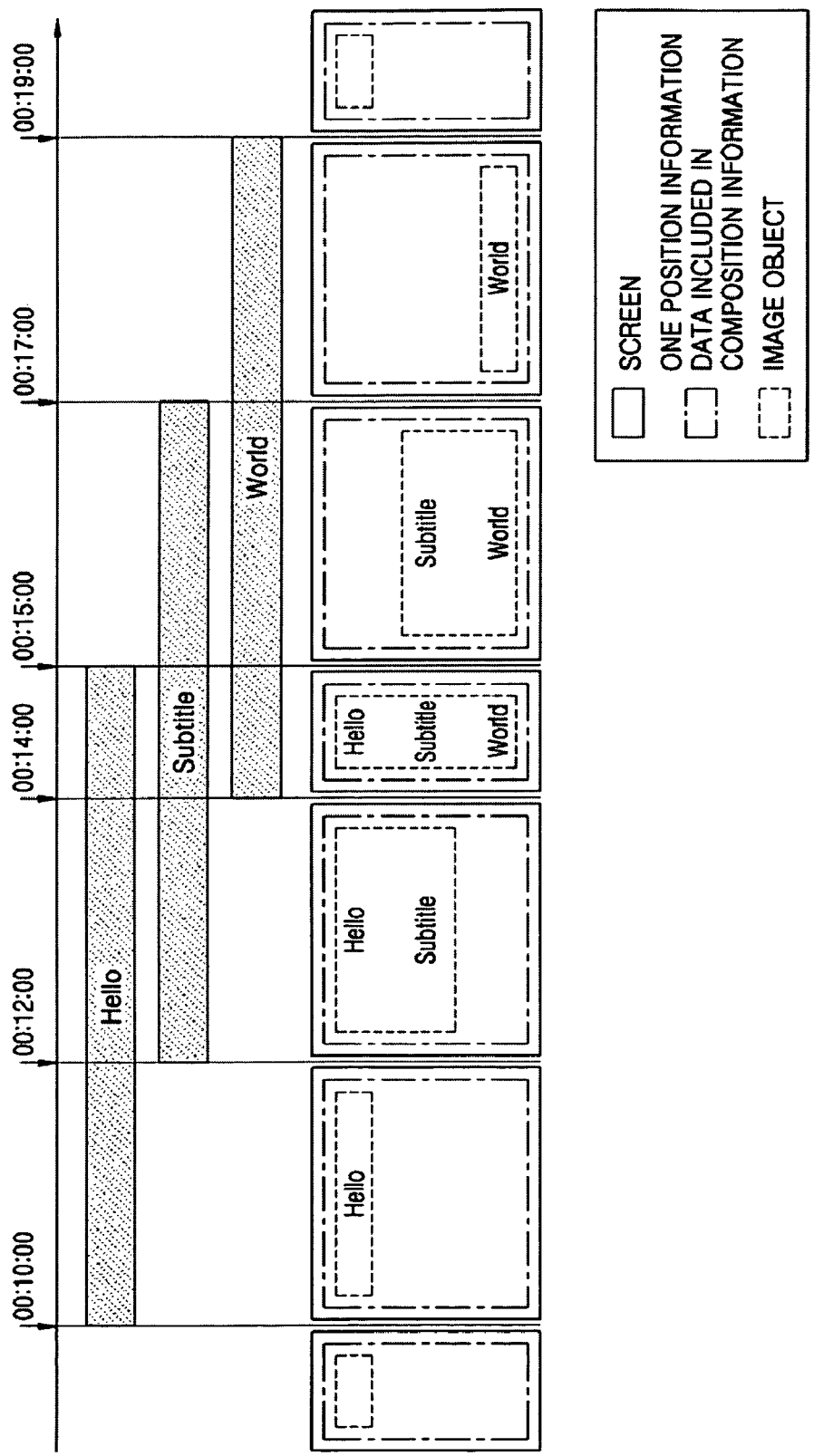

FIGS. 6A through 6C are diagrams illustrating a process of generating an image for a plurality of subtitles using one composition information data and one position information data.

In FIG. 6A, a style "Script" is defined as style information used for subtitle text rendering. Referring to FIG. 6A, the style "Script" uses a font "Arial.ttf", a text color "black", a background color "white", a character size "16pt", a text reference position of coordinates (x, y), an alignment method "center", an output direction "left-to-right-top-to-bottom", a text output region "left, top, width, height", and a line-height "40px".

In FIG. 6B, subtitle texts 610, 620, and 630 rendered using the style "Script" are defined. Referring to FIG. 6B, the subtitle text Hello 610 is output from "00:10:00" to "00:15:00", the subtitle text Subtitle 620 is output from "00:12:00" to "00:17:00", and the subtitle text World 630 is output from "00:14:00" to "00:19:00". Therefore, two or three subtitle texts are output between "00:12:00" and "00:17:00". Here, "<br/>" indicates a line change. Using of the <br/> tag can prevent a plurality of subtitles from being overlapped on one region even though one style is used.

FIG. 6C shows a result of outputting the subtitles defined in FIGS. 6A and 6B. Referring to FIG. 6C, data stored in each buffer of the text subtitle processing unit 220 in each illustrated time window will be described in detail.

Before "00:10:00": the text layout/font renderer 222, when output composition information includes a void subtitle image, comprises:
Element control data buffer: void;
Text data buffer: void;
Style data buffer: style information of "Script"; and
Font data buffer: font information of "Arial.ttf".

From "00:10:00" to "00:12:00": the text layout/font renderer 222, when output composition information including an image in which the subtitle text Hello 610 is rendered, comprises:
Element control data buffer: control information of the subtitle text Hello 610;
Text data buffer: "Hello";
Style data buffer: style information of "Script"; and
Font data buffer: font information of "Arial.ttf".

From "00:12:00" to "00:14:00": the text layout/font renderer 222, when output composition information including an image in which the subtitle text Hello 610 and the subtitle text Subtitle 620 are rendered, comprises:
Element control data buffer: control information of the subtitle text Hello 610 and the subtitle text Subtitle 620;
Text data buffer: "Hello" and "<br/>Subtitle";
Style data buffer: style information of "Script"; and
Font data buffer: font information of "Arial.ttf".

From "00:14:00" to "00:15:00": the text layout/font renderer 222, when output composition information including an image in which the subtitle text Hello 610, the subtitle text Subtitle 620, and the subtitle text World 630 are rendered, comprises:
Element control data buffer: control information of the subtitle text Hello 610, the subtitle text Subtitle 620, and the subtitle text World 630;
Text data buffer: "Hello" and "<br/>Subtitle" and "<br/><br/>World";
Style data buffer: style information of "Script"; and
Font data buffer: font information of "Arial.ttf".

From "00:15:00" to "00:17:00": the text layout/font renderer 222, when output composition information including an image in which the subtitle text Subtitle 620 and the subtitle text World 630 are rendered, comprises:
Element control data buffer: control information of the subtitle text Subtitle 620 and the subtitle text World 630;
Text data buffer: "<br/>Subtitle" and "<br/><br/>World";
Style data buffer: style information of "Script"; and
Font data buffer: font information of "Arial.ttf".

From "00:17:00" to "00:19:00": the text layout/font renderer 222, when output composition information including an image in which the subtitle text World 630 is rendered, comprises:
Element control data buffer: control information of the subtitle text World 630;
Text data buffer: "<br/><br/>World";
Style data buffer: style information of "Script"; and
Font data buffer: font information of "Arial.ttf".

After "00:19:00": the text layout/font renderer 222, when output composition information includes a void subtitle image, comprises:
Element control data buffer: void;
Text data buffer: void;
Style data buffer: style information of "Script"; and
Font data buffer: font information of "Arial.ttf".

As shown in the above subtitle output process, in the first method, one subtitle image is generated by applying the same style to a plurality of subtitle texts having overlapped output times, one composition information data including the one subtitle image is generated, and the generated composition information data is transmitted to the presentation engine 230. At this time, page_time_out indicating the time when the transmitted composition information disappears from a screen refers to the time when a subtitle that is the last output to the screen among a plurality of subtitles having overlapped output times disappears or the time when a new subtitle is added.

Text subtitle processing of the output subtitles must be quickly performed considering a time $T_{decoding}$ taken to perform decoding of the subtitles in the text subtitle processing unit 220 and a time $T_{composition}$ taken to output the rendered subtitles from the object buffer 234 to the graphic planer 240. When $T_{start}$ indicates the time when a subtitle is output from the text subtitle processing unit 220 of the reproducing apparatus, and when $T_{arrival}$ indicates the time when the subtitle arrives at the text subtitle processing unit 220, correlations between these times are calculated by Equation 1.

$$T_{start} - T_{arrival} \geq T_{decoding} + T_{composition} \quad \text{Equation 1}$$

$$T_{decoding} = T_{rendering} + T_{composition\ information\ generation}$$

$$T_{rendering} = \sum_{i=0}^{Num\ of\ char} T_{char(i)}$$

Referring to Equation 1, it can be known how quickly the text subtitle must be processed. Here, $T_{decoding}$ indicates the time taken to render a subtitle to be output, generating composition information including a rendered object, and transmitting the generated composition information to the object buffer 234. The subtitle requiring an output time of $T_{start}$ must start to be processed before at least the time obtained by adding $T_{decoding}$ and $T_{composition}$. The time $T_{decoding}$ is obtained by adding $T_{rendering}$, which is the time taken to render the subtitle text and transmit the rendered subtitle text to the object buffer 234, and $T_{composition\ information\ generation}$, which is the time taken to generate the composition information including the rendered object and transmit the composition information to the graphic planer 240. The time $T_{char}$ is the time taken to render one character. Therefore, $T_{rendering}$ is obtained by adding times taken to render all characters.

The size of the object buffer 234 must be equal to or larger than the size of the object. Here, the size of the object is obtained by adding the sizes of each character data of the object. Therefore, the number of characters composing one subtitle is limited to the number of characters which can be stored in the object buffer 234. Also, since the object buffer 234 can store a plurality of subtitles, the number of characters composing the plurality of subtitles is also limited to the number of characters which can be stored in the object buffer 234.

Figure 7C:
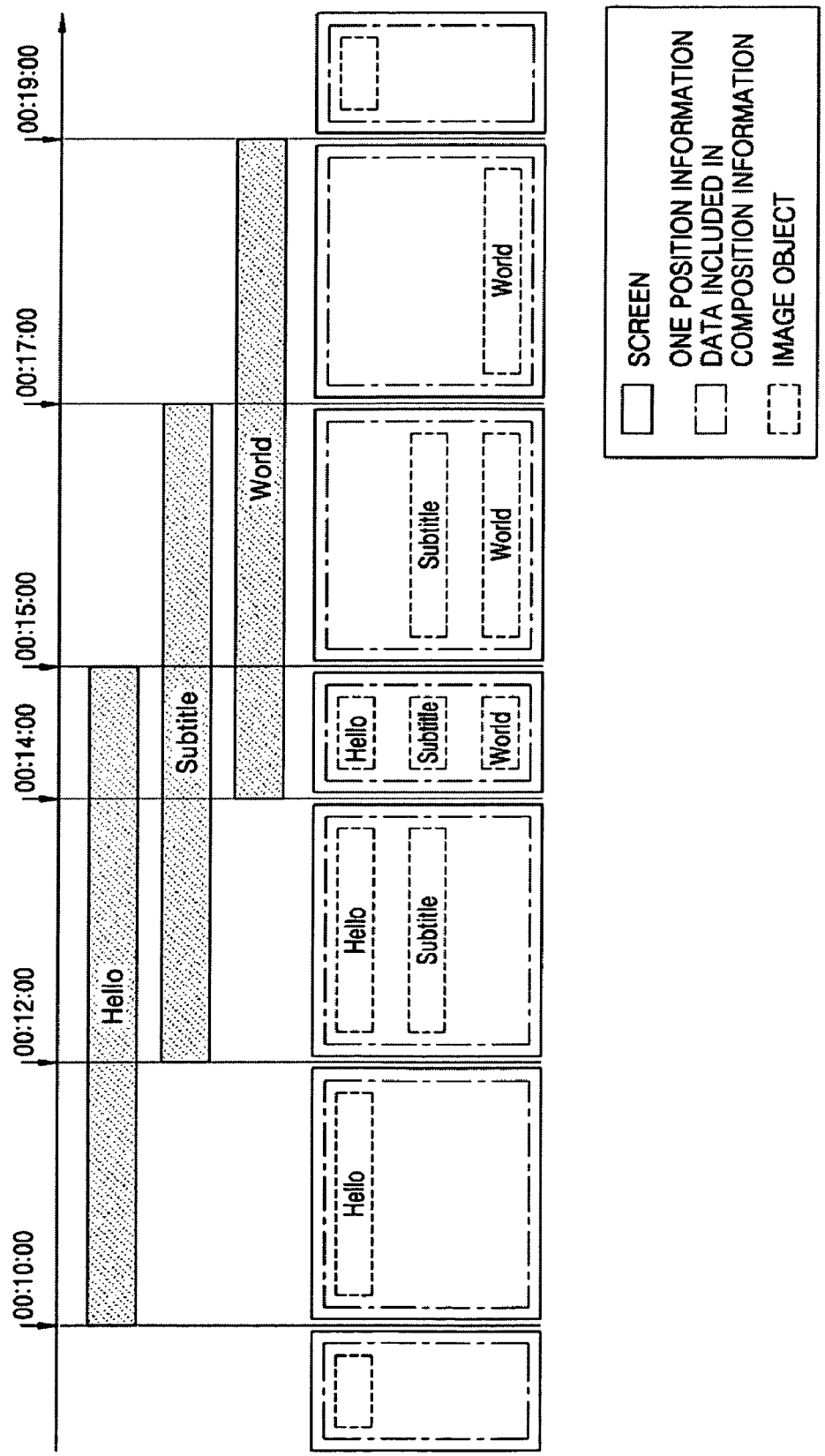

FIGS. 7A through 7C are diagrams illustrating a process of generating an image for a plurality of subtitles using one composition information data and a plurality of position information data.

In FIG. 7A, styles "Script1", "Script2", and "Script3" are defined as style information used for subtitle text rendering. Referring to FIG. 7A, each of the three styles uses a font "Arial.tff", a text color "black", a background color "white", a character size "16pt", an alignment method "center", an output direction "left-to-right-top-to-bottom", and a line-height "40px". As a subtitle text reference position, "Script1" has coordinates (x1, y1), "Script2" has coordinates (x2, y2), and "Script3" has coordinates (x3, y3). As a text output region, "Script1" has "left1, top1, width1, height1", "Script2" has "left2, top2, width2, height2", and "Script3" has "left3, top3, width3, height3".

In FIG. 7B, subtitle texts 710, 720, and 730 rendered using the styles "Script1", "Script2", and "Script3" are defined. Referring to FIG. 7B, the subtitle text Hello 710 uses the style "Script1" and is output from "00:10:00" to "00:15:00", the subtitle text Subtitle 720 uses the style "Script2" and is output from "00: 12:00" to "00: 17:00", and the subtitle text World 730 uses the style "Script3" and is output from "00:14:00" to "00:19:00". Therefore, two or three subtitle texts are output between "00:12:00" and "00:17:00". Since different scripts are used, the line change tag <br/> is unnecessary.

FIG. 7C shows a result of outputting the subtitles defined in FIGS. 7A and 7B. Referring to FIG. 7C, data stored in each buffer of the text subtitle processing unit 220 in each illustrated time window will be described in detail.

Before "00:10:00": the text layout/font renderer 222, when output composition information includes a void subtitle image, comprises:
Element control data buffer: void;
Text data buffer: void;
Style data buffer: void; and
Font data buffer: font information of "Arial.ttf".

From "00:10:00" to "00:12:00": the text layout/font renderer 222, when output composition information includes an image in which the subtitle text Hello 710 is rendered, comprises:
Element control data buffer: control information of the subtitle text Hello 710;
Text data buffer: "Hello";
Style data buffer: style information of "Script1"; and
Font data buffer: font information of "Arial.ttf".

From "00:12:00" to "00:14:00": the text layout/font renderer 222, when output composition information includes the subtitle text Hello 710 and the subtitle text Subtitle 720, comprises:
Element control data buffer: control information of the subtitle text Hello 710 and the subtitle text Subtitle 720;
Text data buffer: "Hello" and "Subtitle";
Style data buffer: style information of "Script1" and "Script2"; and
Font data buffer: font information of "Arial.ttf".

From "00:14:00" to "00:15:00": the text layout/font renderer 222, when output composition information includes the subtitle text Hello 710, the subtitle text Subtitle 720, and the subtitle text World 730, comprises:

Element control data buffer: control information of the subtitle text Hello 710, the subtitle text Subtitle 720, and the subtitle text World 730;
Text data buffer: "Hello", "Subtitle", and "World";
Style data buffer: style information of "Script1", "Script2", and "Script3"; and
Font data buffer: font information of "Arial.ttf".

From "00:15:00" to "00:17:00": the text layout/font renderer 222, when output composition information includes the subtitle text Subtitle 720 and the subtitle text World 730, comprises:
Element control data buffer: control information of the subtitle text Subtitle 720 and the subtitle text World 730;
Text data buffer: "Subtitle" and "World";
Style data buffer: style information of "Script2" and "Script3"; and
Font data buffer: font information of "Arial.ttf".

From "00:17:00" to "00:19:00": the text layout/font renderer 222, when output composition information includes the subtitle text World 730, comprises:
Element control data buffer: control information of the subtitle text World 730;
Text data buffer: "World";
Style data buffer: style information of "Script3"; and
Font data buffer: font information of "Arial.ttf".

After "00:19:00": the text layout/font renderer 222, when output composition information includes a void subtitle image, comprises:
Element control data buffer: void;
Text data buffer: void;
Style data buffer: void; and
Font data buffer: font information of "Arial.ttf".

In the second method described above, subtitle images for subtitle texts are generated by applying different styles to a plurality of subtitle texts having overlapped output times, one composition information data including the subtitle images is generated, and the generated composition information data is transmitted to the presentation engine 230. A text subtitle processing time is the same as that of the first method. That is, text subtitle processing of the output subtitles must be quickly performed considering a time $T_{decoding}$ taken to perform decoding of the subtitles in the text subtitle processing unit 220 and a time $T_{composition}$ taken to output the rendered subtitles from the object buffer 234 to the graphic planer 240. However, in this method, since a plurality of objects exist, a rendering time is obtained by adding the times taken to render the respective objects. That is, Equation 2 calculates the rendering time.

$$T_{start} - T_{arrival} \geq T_{decoding} + T_{composition} \quad \text{Equation 2}$$

$$T_{decoding} = T_{rendering} + T_{composition\ information\ generation}$$

$$T_{rendering} = \sum_{i=0}^{Num\ of\ obj} T_{OBJ(i)}$$

$$T_{OBJ} = \sum_{i=0}^{Num\ of\ char} T_{char(i)}$$

The number of characters of the subtitle text which can be stored in the object buffer 234 is limited in the second method to the same as that of the first method.

Figure 8C:
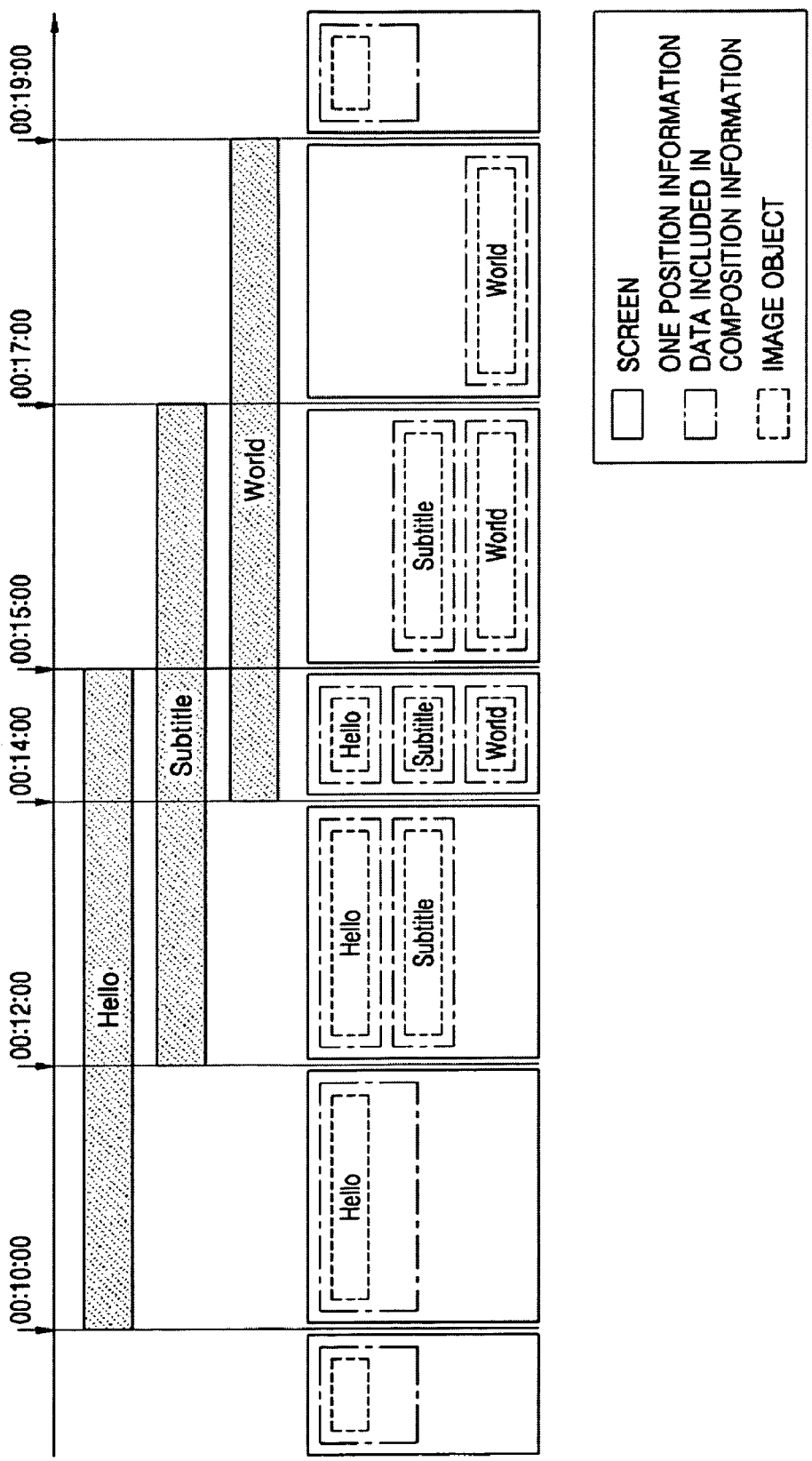

FIGS. 8A through 8C are diagrams illustrating a process of generating an image so that one image object is included in one composition information data by allocating a plurality of composition information data for a plurality of subtitles.

In FIG. 8A, styles "Script1", "Script2", and "Script3" are defined as style information used for subtitle text rendering. Referring to FIG. 8A, each of the three styles uses a font "Arial.ttf", a text color "black", a background color "white", a character size "16pt", an alignment method "center", an output direction "left-to-right-top-to-bottom", and a line-height "40px". As a subtitle text reference position, "Script1" has coordinates (x1, y1), "Script2" has coordinates (x2, y2), and "Script3" has coordinates (x3, y3). As a text output region, "Script1" has "left1, top1, width1, height1", "Script2" has "left2, top2, width2, height2", and "Script3" has "left3, top3, width3, height3".

In FIG. 8B, subtitle texts 810, 820, and 830 rendered using the styles "Script1", "Script2", and "Script3" are defined. Referring to FIG. 8B, the subtitle text Hello 810 uses the style "Script1" and is output from "00:10:00" to "00:15:00", the subtitle text Subtitle 820 uses the style "Script2" and is output from "00: 12:00" to "00: 17:00", and the subtitle text World 830 uses the style "Script3" and is output from "00:14:00" to "00:19:00". Therefore, two or three subtitle texts are overlapped between "00:12:00" and "00:17:00".

FIG. 8C shows a result of outputting the subtitles defined in FIGS. 8A and 8B. Referring to FIG. 8C, data stored in each buffer of the text subtitle processing unit 220 in each illustrated time window will be described in detail.

From "00:00:00": the text layout/font renderer 222, when output composition information includes a void subtitle image, comprises:
Element control data buffer: void;
Text data buffer: void;
Style data buffer: void; and
Font data buffer: font information of "Arial.ttf".

From "00:10:00": the text layout/font renderer 222, when output composition information including an image in which the subtitle text Hello 810 is rendered, comprises:
Element control data buffer: load control information of the subtitle text Hello 810;
Text data buffer: "Hello";
Style data buffer: style information of "Script1"; and
Font data buffer: font information of "Arial.ttf".

From "00:12:00": the text layout/font renderer 222, when output composition information including the subtitle text Hello 810 and composition information including the subtitle text Subtitle 820 is rendered, comprises:
Element control data buffer: load control information of the subtitle text Subtitle 820;
Text data buffer: "Subtitle";
Style data buffer: style information of "Script2"; and
Font data buffer: font information of "Arial.ttf".

From "00:14:00": the text layout/font renderer 222, when output composition information including the subtitle text Hello 810, composition information including the subtitle text Subtitle 820, and composition information including the subtitle text World 830 is rendered, comprises:
Element control data buffer: load control information of the subtitle text World 830;
Text data buffer: "World";
Style data buffer: style information of "Script3"; and
Font data buffer: font information of "Arial.ttf".

After "00:15:00": the text subtitle processing unit 220 does not execute any operation until preparing an output for subsequent subtitle texts to be output after "00:19:00". Therefore, changes of subtitles output between "00:15:00" and "00:19:00" are performed by the presentation engine 230 controlling the composition information of the subtitles "Hello", "Subtitle", and "World" received from the text subtitle processing unit 220.

That is, at "00:15:00", the presentation engine 230 deletes the composition information and bitmap image object of the subtitle "Hello" from the composition buffer 233 and the object buffer 234 and outputs only the composition information of the subtitles "Subtitle" and "World" onto a screen. At "00:17:00", the presentation engine 230 deletes the composition information and bitmap image object of the subtitle "Subtitle" from the composition buffer 233 and the object buffer 234 and outputs only the composition information of the subtitle "World" onto the screen. Also, at "00:19:00", the presentation engine 230 deletes the composition information and bitmap image object of the subtitle "World" from the composition buffer 233 and the object buffer 234 and does not output a subtitle onto the screen any more.

In the third method described above, one subtitle image for each subtitle text is generated by applying different styles to a plurality of subtitle texts having overlapped output times, one composition information data is generated for each subtitle image, and the generated plurality of composition information data are transmitted to the presentation engine 230. A text subtitle processing time is the same as that of the first method. While only a processing time of only one composition information data is considered in the first and second methods since one composition information data for a plurality of subtitle texts having overlapped output times is composed and output, a plurality of composition information data are generated and output in the third method since each subtitle text composes a separate composition information data. Therefore, for a subtitle text processing start time of the third method, the worst case, that is, a case where a plurality of composition information data for a plurality of subtitles having the same output start time are simultaneously generated and output, must be considered. This is described by Equation 3.

$$T_{start} - T_{arrival} \geq T_{decoding} + T_{composition} \qquad \text{Equation 3}$$

$$T_{decoding} = T_{rendering} + T_{composition\ information\ generation}$$

$$T_{composition\ information\ generation} = \sum_{i=0}^{Num\ of\ composition\ information} T_{composition\ information(i)}$$

$$T_{rendering} = \sum_{i=0}^{Num\ of\ obj} T_{OBJ(i)}$$

$$T_{OBJ} = \sum_{i=0}^{Num\ of\ char} T_{char(i)}$$

The time $T_{composition\ information\ generation}$ taken to generate a plurality of composition information data is obtained by adding each $T_{composition\ information}$, which is a composition information generation time of one subtitle, all together. The time $T_{rendering}$ taken to generate a plurality of objects by rendering a plurality of subtitles is obtained by adding each $T_{OBJ}$, which is a rendering time of one subtitle, all together. The time $T_{OBJ}$ taken to render one subtitle is obtained by adding each $T_{char}$, which is a rendering time of each character included in a relative subtitle, all together. Referring to Equation 3, in order to simultaneously output a plurality of subtitles including a plurality of characters, a sum of times taken to render all characters included in the subtitles, compose the plurality of composition information data, and output the plurality of composition information data must be less than a difference between a subtitle output time and a subtitle processing start time of the text subtitle processing unit 220.

The number of characters of the subtitle text that can be stored in the object buffer 234 is limited in the third method to the same as that of the first method or the second method.

As described in the third method, in an information storage medium and a reproducing apparatus constructed with a structure supporting simultaneous output of a plurality of composition information data, a text subtitle and another bitmap image can be simultaneously output onto a screen.

Data compressed and encoded in an AV stream includes video data, audio data, bitmap-based subtitles, and other non-subtitle bitmap images. An image "TV-14" displayed on a top-right of a screen in order to indicate a TV program for people over 14 years old is an example of the non-subtitle bitmap images. In a conventional method, since only one composition information data is output onto a screen at one time, a region for outputting a bitmap subtitle and a region for outputting a non-subtitle bitmap image are separately defined in composition information in order to simultaneously output the bitmap subtitle and the non-subtitle bitmap image.

Accordingly, when a user turns an output of subtitles off since the user does not want the output of the subtitles, a decoder stops only decoding of the subtitles. Therefore, since subtitle data is not transmitted to an object buffer, the subtitles disappear from a screen, and only the non-subtitle bitmap image is continuously output onto the screen.

When the text subtitle processing unit 220 generates an image for a subtitle using one composition information data and transmits the composition information data to the presentation engine 230 in order to output the subtitle, if an output of subtitles is turned off, a non-subtitle bitmap image recorded in an AV stream is also not output. Therefore, in a case where a plurality of composition information data can be simultaneously output onto a screen as described in the third method of the present invention, when text subtitles are selected instead of bitmap subtitles, images except the bitmap subtitles in composition information included in an AV stream can be continuously output, and the text subtitles can be output using composition information generated by the text subtitle processing unit 220. That is, the text subtitles and the other non-subtitle bitmap images can be simultaneously output onto the screen.

The present invention may be embodied in a general-purpose computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the Internet). The present invention may be embodied as a computer-readable medium having a computer-readable program code unit embodied therein for causing a number of computer systems connected via a network to effect distributed processing. Functional programs, codes, and code segments for embodying the present invention may be easily written by programmers in the art to which the present invention relates.

As described above, according to an embodiment of the present invention, a subtitle file can be easily produced, and subtitles for an AV stream can be output in various forms.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reproducing method using an information storage medium comprising audio-visual (AV) data, the reproducing method comprising:
reading from the information storage medium at least one text subtitle data and style information that corresponds to the at least one text subtitle data and designates an output form of the at least one text subtitle data; and
decoding the style information; and
outputting the at least one text subtitle data using the style information;
wherein the style information comprises:
location information specifying a region in which the at least one text subtitle data is to be output;
coordinates of a text reference position of the at least one text subtitle data within the region; and
alignment information specifying how the at least one text subtitle data is to be aligned within the region.

2. A reproducing method using an information storage medium comprising audio-visual (AV) data, the reproducing method comprising:
reading from the information storage medium first text subtitle data, first style information that corresponds to the first text subtitle data and designates an output form of the first text subtitle data, second text subtitle data, and second style information that corresponds to the second text subtitle data and designates an output form of the second text subtitle data; and
decoding the first style information and the second style information; and
outputting the first text subtitle data and the second text subtitle data at different locations on a screen simultaneously using the first style information and the second style information;
wherein the first style information comprises:
location information specifying a first region in which the first text subtitle data is to be output;
coordinates of a text reference position of the first text subtitle data within the first region; and
alignment information specifying how the first text subtitle data is to be aligned within the first region; and
the second style information comprises:
location information specifying a second region in which the second text subtitle data is to be output;
coordinates of a text reference position of the second text subtitle data within the second region; and
alignment information specifying how the second text subtitle data is to be aligned within the second region.

* * * * *